Patented Sept. 6, 1949

2,481,438

UNITED STATES PATENT OFFICE 2,481,438

N(ETHYL MERCURY)-p-TOLUENE SULFON-ANILIDE AS SEED DISINFECTANT

Dwight F. Mowery, Jr., Marblehead, Mass., assignor to E. I. du Pont de Nemours & Company, Wilmington, Del., a corporation of Delaware No Drawing. Application February 15, 1947, Serial No. 728,949

4 Claims. (Cl. 167—38)

This invention relates to compositions and methods for use in the treatment of seed diseases and is more particularly directed to dusts or powdered compositions containing as an essential active ingredient N(ethyl mercury)-p-toluene sulfonanilide and to methods for the treatment of seed to control infections.

N(ethyl mercury)-p-toluene sulfonanilide is represented by the formula

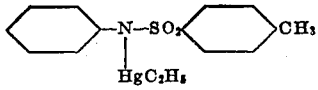

This application is a continuation-in-part of my copending application Serial No. 581,721 filed March 8, 1945, now Patent 2,452,595 issued November 2, 1948.

Several organo mercury compounds have found use in the trade for seed disinfecting purposes. The materials are highly effective but users have in some circumstances found them unpleasant to work with because of a disagreeable odor which is frequently present. Some people do not consider them to be too safe since there have been reports of users experiencing skin irritation and even blistering of the skin. Thus there has existed a need for a seed treating composition possessing a high degree of effectiveness and which at the same time will not be subject to criticism because of unpleasant odor or vesicant action.

It is an object of this invention to provide seed disinfecting compositions which contain as an active ingredient a highly effective organo mercury compound and which are not characterized by having objectionable odor and vesicant action. Another object is to provide new methods for the control of seed diseases. Still other objects will become apparent hereinafter.

The foregoing and other objects of the invention are attained by means of dust compositions containing as an essential active ingredient N(ethyl mercury)-p-toluene sulfonanilide in admixture with a finely divided inert powder.

N(ethyl mercury)-p-toluene sulfonanilide suitable for use in the compositions and methods of this invention may be suitably prepared according to the processes fully set out in my aforementioned copending application Serial No. 581,721, now Patent 2,452,595 issued Nov. 2, 1948. In this method tetra ethyl lead and acetic acid are reacted with mercuric oxide to obtain a mixture of ethyl mercury acetate and lead acetate and this mixture is then reacted in aqueous alkali with p-toluene sulfonanilide at a temperature between about —20° C. and +30° C. There is thus obtained a crystalline crude N(ethyl mercury)-p-toluene sulfonanilide which contains minor amounts of unreacted material. This crude material generally has a melting point in the range of 146°–152° C. and is well suited for use in the compositions and methods of the invention.

The crude N(ethyl mercury)-p-toluene sulfonanilide may, if desired, be purified by recrystallization and obtained in a form of colorless, coarse needles melting at 156° C.

In the preparation of the dusts or finely powdered compositions of the invention, N(ethyl mercury)-p-toluene sulfonanilide is admixed with a finely divided inert powder. A wide variety of inert powders suitable for use in pest control compositions generally are known and these same inert powders or so-called powders or diluents may also be used in formulating the compositions of this invention. One skilled in the art will realize, however, that the various inert powders differ with regard to physical properties and therefore will impart differing physical characteristics to the finished formulation. Therefore, the particular choice of a carrier or combination of carriers is governed largely by the properties desired in the finished dust formulation and the particular use to which the dust is to be put.

Typical of finely divided inert powders suitable for use in admixture with N(ethyl mercury)-p-toluene sulfonanilide in the preparation of the compositions of the invention are the commercially available talcs, pyrophyllites, fuller's earth, starches, natural clays such as bentonite and China clay, and diatomaceous earths such as celite. Such materials as supplied generally have an average particle size less than about 50 microns. Other powders which may be used in the dust compositions include such finely divided powders as calcium phosphate, calcium carbonate, magnesium carbonate, sulfur, lime, and flours such as walnut shell, wheat, redwood, soya bean, and cottonseed.

In order to provide suitable water-dispersible compositions of the invention, the compositions should also contain an effective amount of a dispersing agent. A dispersing agent particularly well suited for this purpose is goulac. Many other wetting agents may also be used such as those proprietary preparations listed in detail as dispersing agents in Bulletin E-607 of the Bureau of Entomology and Plant Quarantine of the U. S. Department of Agriculture.

The compositions of the invention may also include other fungicides such as copper carbonate, zinc oxide, organic and inorganic mercurials; and insecticides such as 2,2-bis-(4-chlorophenyl)-1,1,1-trichloroethane, 2,2-bis - (4 - methoxyphenyl)-1,1,1-trichloroethane, and hexachlorocyclohexane. It is generally undesirable, however, to include in the compositions fungicidal and insecticidal agents which are derivatives of dithiocarbamic acid such as tetramethyl thiuram disulfide because, if this is done, a disagreeable odor develops on aging of the composition.

The concentration of N(ethyl mercury)-p-toluene sulfonanilide in the compositions of the invention may be varied widely depending upon the particular use to which the composition is to be put. Preferably, however, the compositions of the invention contain from about 5 to 15 per cent by weight of N(ethyl mercury)-p-toluene sulfonanilide.

The N(ethyl mercury)-p-toluene sulfonanilide may be brought together and admixed with suitable finely divided inert powders in any of the conventional mixing equipment such as, for example, ribbon mixers or ball mills. Other materials which may be included in the final formulations, such as dispersing agents, wetting agents, or other fungicides, seed disinfectant materials, or insecticides, may also be mixed and ground in this operation, or, alternatively, these additional materials may be admixed in a simple mixing operation or in a subsequent grinding operation following the initial mixing and grinding of the N(ethyl mercury)-p-toluene sulfonanilide with a finely divided inert powder.

The compositions of the invention have an average particle size of less than about 50 microns. In preferred compositions of the invention, the average particle size of the N(ethyl mercury)-p-toluene sulfonanilide is less than about 5 microns. Such compositions can be obtained by first grinding the N(ethyl mercury)-p-toluene sulfonanilide separately for an extended time in a ball mill or in an air attrition mill such as those described in Patents 2,032,827, 2,219,011, and 2,284,746, or still more conveniently the N(ethyl mercury)-p-toluene sulfonanilide is first mixed with an inert powder and then the mixture is ball milled or ground in an air attrition mill so that a mixture having an average particle size less than about 5 microns is obtained.

Compositions prepared according to a preferred embodiment of the invention contain from 5 to 15 per cent by weight of N(ethyl mercury)-p-toluene sulfonanilide, 15 to 40 per cent by weight bentonite, 30 to 70 per cent by weight starch, and a dispersing agent in effective amount. The compositions so obtained are free-flowing and may be maintained in storage for extended periods without caking. They have the advantage of being water dispersible so that they may be applied to seed either in the form of a dust or, if preferred, from a dispersion or suspension such as a slurry of the composition in water.

The compositions of the invention are useful in the control of a wide variety of seed diseases. For example, excellent results have been obtained in the treatment of seeds for the control of loose smut of oats (*Ustilago avenae*), bunt or stinking smut of wheat (*Tilletia tritici*), covered smut of barley (*Ustilago hordei*), covered smut of oats (*Ustilago levis*), anthracnose of cotton (*Glomerella gossypii*), stripe disease of barley (*Helminthosporium gramineum*), blight of oats (*Helminthosporium sp.*), and seed decay of flax.

The optimum dosage required in the treatment of seeds will vary with the particular seed and the nature of the disease to be combatted. In general, however, satisfactory treatments are obtained by applying compositions of the invention to seeds in such amounts as to provide from about 15 to 50 grains avoirdupois of N(ethyl mercury)-p-toluene sulfonanilide per bushel of seed.

The invention will be further illustrated by the following examples:

*Example 1*

N(ethyl mercury)-p-toluene sulfonanilide is admixed and ground with talc in a ball mill to obtain a finely divided, free-flowing dust.

The composition of this example applied to the seeds of cotton, oats, and wheat gives excellent results in that substantially larger and better crops are obtained from seeds so treated than are obtained from untreated seeds.

*Example 2*

N(ethyl mercury)-p-toluene sulfonanilide is intimately mixed in a ribbon blender with bentonite, cornstarch, and goulac and this mixture is then further mixed and ground in a ball mill to give a free-flowing, water-dispersible powder having the following formulation:

|   | Per cent |
|---|---|
| N(ethyl mercury)-p-toluene sulfonanilide | 9 |
| Bentonite | 20 |
| Cornstarch | 69 |
| Goulac | 2 |

The composition of this example may be used successfully in the treatment of seeds by applying it to the seed either in the form of a dust or by contacting the seed with a dispersion of the composition in water. Adequate protection is generally obtained by applying the composition of this example in a dosage of from about ½ to 1½ ounces per bushel of seed.

*Example 3*

An excellent water-dispersible seed disinfectant powder is obtained by mixing N(ethyl mercury)-p-toluene sulfonanilide with China clay in the proportion of 4 parts by weight of China clay for each part by weight of sulfonanilide, subjecting this mixture to attrition in an air attrition mill to obtain a power having an average particle size less than 5 microns and then admixing this powder with other diluents and conditioning agents to provide a composition having the following formulation:

|   | Per cent |
|---|---|
| N(ethyl mercury)-p-toluene sulfonanilide | 9.0 |
| China clay | 34.0 |
| Cornstarch | 35.0 |
| Bentonite | 20.0 |
| Goulac | 1.9 |
| Alkanol B (a proprietary wetting agent containing sodium alkyl naphthalene sulfonate) | 0.1 |

The composition of this example is highly effective in the treatment of seeds for the control of a wide variety of seed diseases.

I claim:

1. A dust composition useful as a seed disinfectant comprising as an essential active ingredient N(ethyl mercury)-p-toluene sulfonanilide in admixture with a finely divided inert powder.

2. A dust composition useful as a seed disinfectant comprising as an essential active ingredient N(ethyl mercury)-p-toluene sulfonanilide in admixture with a finely divided inert powder, the average particle size of the crude N(ethyl mercury)-p-toluene sulfonanilide in the mixture being less than about 5 microns.

3. A water-dispersible dust composition useful as a seed disinfectant which comprises N(ethyl mercury)-p-toluene sulfonanilide in admixture with an effective amount of a dispersing agent and a finely-divided inert powder.

4. A water-dispersible dust composition useful as a seed disinfectant which comprises 5 to 15 per cent by weight N(ethyl mercury)-p-toluene sulfonanilide, 15 to 40 per cent by weight bentonite, 30 to 70 per cent by weight starch, and a dispersing agent in effective amount.

DWIGHT F. MOWERY, Jr.

REFERENCES CITED

The following references are of record in the file of this patent:

UNITED STATES PATENTS

| Number | Name | Date |
|---|---|---|
| 1,618,369 | Englemann | Feb. 22, 1927 |
| 1,752,424 | Englemann | Apr. 1, 1930 |
| 1,919,732 | Kharasch | July 20, 1933 |
| 1,967,372 | Schonhofer et al. | July 24, 1934 |
| 2,135,553 | Andersen | Nov. 8, 1938 |
| 2,273,443 | Klos | Feb. 17, 1942 |